United States Patent
Aldersley et al.

(10) Patent No.: US 11,332,065 B2
(45) Date of Patent: May 17, 2022

(54) FASTENING FOR A VEHICLE PART TO A VEHICLE BODY OF A MOTOR VEHICLE

(71) Applicant: Bayerische Motoren Werke Aktiengesellschaft, Munich (DE)

(72) Inventors: Nicholas Aldersley, Hebertshausen (DE); Thomas Fleck, Leipzig (DE); Matthias Ruppert, Loebnitz (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/254,677

(22) PCT Filed: May 14, 2019

(86) PCT No.: PCT/EP2019/062284
§ 371 (c)(1),
(2) Date: Dec. 21, 2020

(87) PCT Pub. No.: WO2019/242937
PCT Pub. Date: Dec. 26, 2019

(65) Prior Publication Data
US 2021/0146825 A1 May 20, 2021

(30) Foreign Application Priority Data
Jun. 22, 2018 (DE) ...................... 10 2018 210 222.8

(51) Int. Cl.
*B60Q 1/30* (2006.01)
*B60Q 1/04* (2006.01)
*B60Q 1/26* (2006.01)

(52) U.S. Cl.
CPC ............. *B60Q 1/2626* (2013.01); *B60Q 1/30* (2013.01); *B60Q 1/0433* (2013.01); *B60Q 1/2638* (2013.01); *B60Q 1/2653* (2013.01)

(58) Field of Classification Search
CPC ...... B60Q 1/2626; B60Q 1/30; B60Q 1/0433; B60Q 1/2638; B60Q 1/2653
See application file for complete search history.

(56) References Cited

U.S. PATENT DOCUMENTS

| 5,975,734 A | 11/1999 | Mueller |
| 6,135,619 A | 10/2000 | Donaire Camacho et al. |

FOREIGN PATENT DOCUMENTS

| DE | 697 02 478 T2 | 12/2000 |
| DE | 10 2012 005 104 A1 | 9/2013 |
| EP | 0 838 369 A2 | 4/1998 |
| EP | 0 904 980 A2 | 3/1999 |

OTHER PUBLICATIONS

International Search Report (PCT/ISA/210) issued in PCT Application No. PCT/EP2019/062284 dated Jul. 18, 2019 with English translation (seven (7) pages).
German-language Written Opinion (PCT/ISA/237) issued in PCT Application No. PCT/EP2019/062284 dated Jul. 18, 2019 (six (6) pages).
German-language Search Report issued in German Application No. 10 2018 210 222.8 dated Apr. 16, 2019 with partial English translation (14 pages).

*Primary Examiner* — Joseph L Williams
(74) *Attorney, Agent, or Firm* — Crowell & Moring LLP

(57) ABSTRACT

A motor vehicle has a body, a vehicle part, and a spring bolt for fastening the vehicle part in a receptacle of the body. The rotational axis of the spring bolt is arranged in such a way that it has exactly one point of intersection with an XY plane of the motor vehicle.

11 Claims, 3 Drawing Sheets

FASTENING FOR A VEHICLE PART TO A VEHICLE BODY OF A MOTOR VEHICLE

BACKGROUND AND SUMMARY OF THE INVENTION

The invention relates to a motor vehicle.

Fastening apparatuses are known in the prior art for fastening a vehicle part to a vehicle body of a motor vehicle. A vehicle part of this type can be, in particular, a rear light. Within the context of the present invention, the vehicle body of a motor vehicle also comprises the tailgate of the motor vehicle.

It is known here for rear lights to be connected on tailgates by way of, for example, two or three screw connections, optionally with what are known as clamping straps, guide elements, elastic elements, seals, etc. The rear lights are oriented substantially on defined bearing points on a perpendicular light cup bottom of the tailgate. Here, perpendicular means in the Z-direction of the motor vehicle.

It is now desirable, however, for lights with a small height but a great depth to be provided. As a result, the bottom of the cup becomes smaller, and the spacing of the bottom from gap-forming edges becomes greater. Therefore, the gap tolerances grow considerably (order of magnitude twice as great as up to now).

Gap targets which are predefined for lights of this type can no longer be achieved, however, by way of the known fastening apparatuses. In addition, frictional forces increase between the seal and the bearing points in an undesired way, which would lead to damage and gap changes. In addition, a loss of the process reliability would be threatened.

It is therefore an object of the invention to provide a precise and non-complex fastening for vehicle parts to a vehicle body of a motor vehicle, which fastening minimizes tolerances for gaps between the vehicle part and the vehicle body.

According to the invention, this object is achieved by way of a motor vehicle, comprising a vehicle body, a vehicle part, and a spring bolt for fastening the vehicle part in a receptacle of the vehicle body, the rotational axis D of the spring bolt being arranged in such a way that it has precisely one point of intersection S with an XY-plane of the motor vehicle.

As a result, it is made possible for the vehicle part to be held by way of only one screw connection. As a result of the oblique screw connection, a part of the prestressing force acts upward in the Z-direction during and after the screwing operation. Adjusting elements are not required here. The vehicle part is pulled at the same time without adjustment against the bottom of the receptacle and a top wall of the receptacle. The gap targets are not only achieved, but rather are considerably exceeded. Furthermore, the spring force of the spring bolt acts permanently, independently of coefficients of friction and setting behavior. If, in particular, the vehicle body comprises tailgates which can be slammed shut, the force of the spring acts counter to the inertia of the vehicle part when they are slammed shut.

In one particularly preferred embodiment, the angle of intersection α between the rotational axis D of the spring bolt and the XY-plane of the motor vehicle lies in the range from 10° to 40°. In said range, the vehicle part is pulled particularly satisfactorily against the bottom of the receptacle and the top of the receptacle. An angle of intersection α of substantially 15° is particularly preferred.

The vehicle part is particularly preferably a vehicle light in all embodiments.

According to the invention, furthermore, the vehicle body comprises a tailgate which has the receptacle.

In one particularly preferred embodiment, the vehicle part has at least one Z-rest, by way of which the vehicle part bears in the receptacle in such a way that at least one part Fz of the axial force F which results from the spring bolt acts in the Z-direction of the motor vehicle. In this way, bearing of the vehicle part against the gap-forming edges in the Z-direction of the motor vehicle is ensured. The upper gap is prioritized, and the tolerance is reduced to a very small value as a result of the contact.

In one preferred embodiment, the vehicle part has at least one X-rest, by way of which the vehicle part bears in the receptacle in such a way that at least one part FX of the axial force F which results from the spring bolt acts in the X-direction of the motor vehicle. As a result, for example in the case of a rear light, the latter can be pulled particularly satisfactorily against the bottom of the receptacle, and the tolerance can be reduced to a very small value.

In accordance with said embodiments, it is particularly advantageous if the vehicle part has three X-rests and two Z-rests. As a result, the vehicle part can be connected to the vehicle body in a simple way and with small tolerance values without additional adjusting elements.

In all embodiments, the vehicle part can have a Y-setting pin for orienting the vehicle part in the Y-direction of the motor vehicle.

In one preferred embodiment, the rotational axis D of the spring bolt is arranged parallel to an XZ-plane of the motor vehicle. In said arrangement of the spring bolt, for example, an upper gap region which is oriented substantially parallel to the XY-plane of the motor vehicle is prioritized.

In another preferred embodiment, the rotational axis D of the spring bolt is arranged in such a way that it has precisely one point of intersection with an XZ-plane of the motor vehicle. The oblique arrangement of the spring bolt is advantageous depending on the gap design. Here, for example, a perpendicular gap region which is oriented substantially parallel to the XZ-plane of the motor vehicle can be prioritized in a similar way. Here, angles of intersection between the rotational axis D of the spring bolt 40 and the XZ-plane of the motor vehicle which lie in the range from 10° to 40° are particularly advantageous.

In one embodiment according to the invention, a vehicle part comprises a spring bolt for fastening the vehicle part in a receptacle of a vehicle body of a motor vehicle, the rotational axis of the spring bolt being arranged in such a way that, in the case of the intended arrangement of the vehicle part on the vehicle body, it has precisely one point of intersection with an XY-plane of the motor vehicle.

Embodiments of the invention will be described in the following text on the basis of the figures.

DETAILED DESCRIPTION OF THE DRAWINGS

Figure 1:
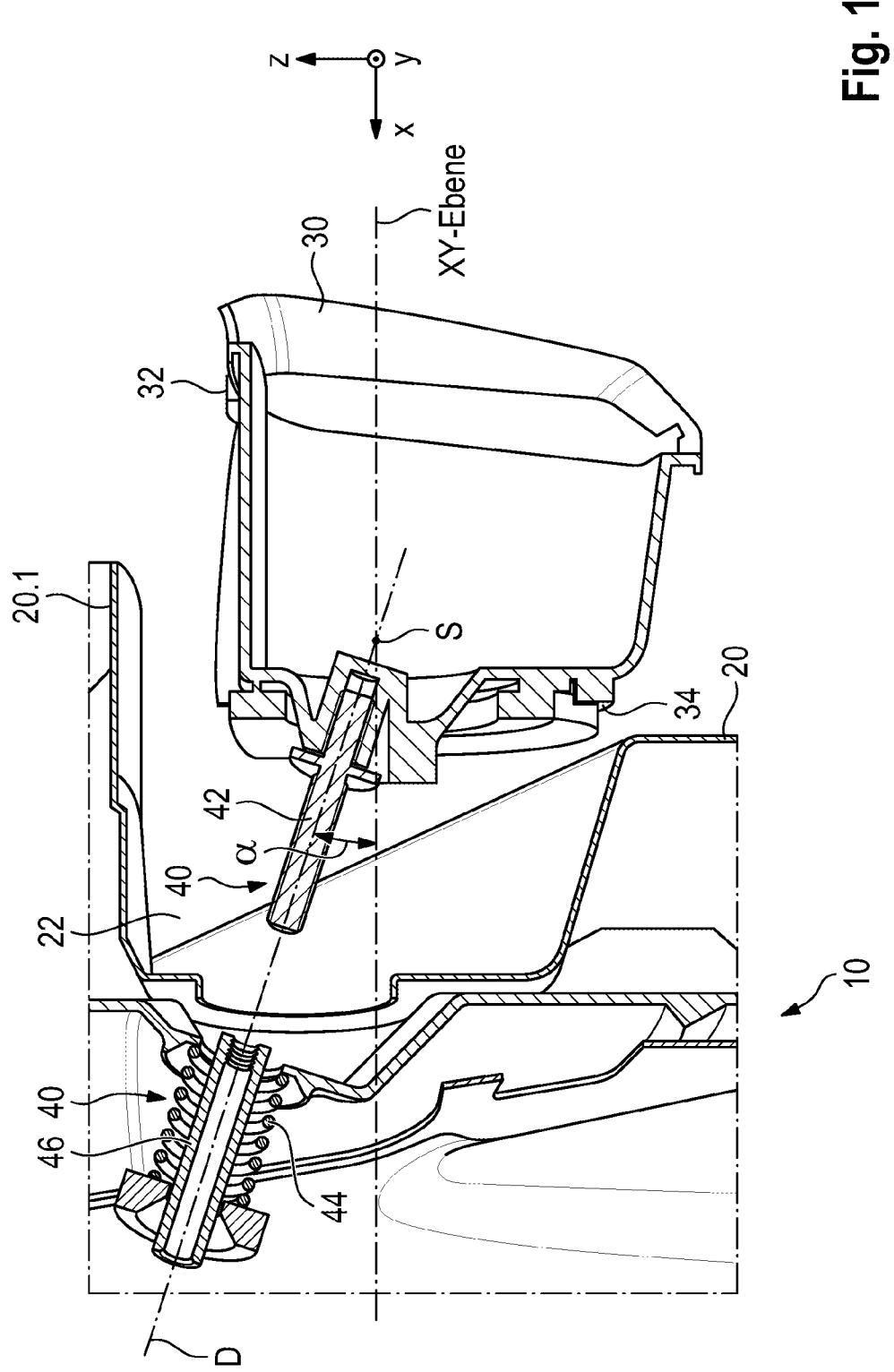
FIG. 1 is a diagrammatic exemplary embodiment of a motor vehicle in a sectional view, in which a vehicle part is inserted into a receptacle of a vehicle body.

FIG. 1 shows a part of a motor vehicle 10 in a sectional view in the XZ-plane of the motor vehicle 10 with a viewing direction in the Y-direction of the motor vehicle 10. The motor vehicle 10 has a vehicle body 20. Within the context of this invention, the vehicle body 20 also comprises a tailgate 20.1. A receptacle 22 is arranged in the vehicle body 20, in which receptacle 22 a vehicle part 30 is received. FIGS. 1 to 4 show a rear light by way of example as a vehicle part 30.

The vehicle part 30 is fastened in the receptacle 22 with the aid of a spring bolt 40. FIG. 1 shows that a threaded bolt 42 of the spring bolt 40 can be arranged, for example, on the vehicle part 30. As FIG. 1 also shows, other known constituent parts of the spring bolt 40 can be arranged in an opening of the receptacle 22, such as, for example, a spring 44, a housing with a thread 46, etc. Before the insertion of the vehicle part 30, the spring bolt 40 is not prestressed. The spring bolt 40 is arranged, for example, in the bottom of the receptacle 22.

Figure 2:
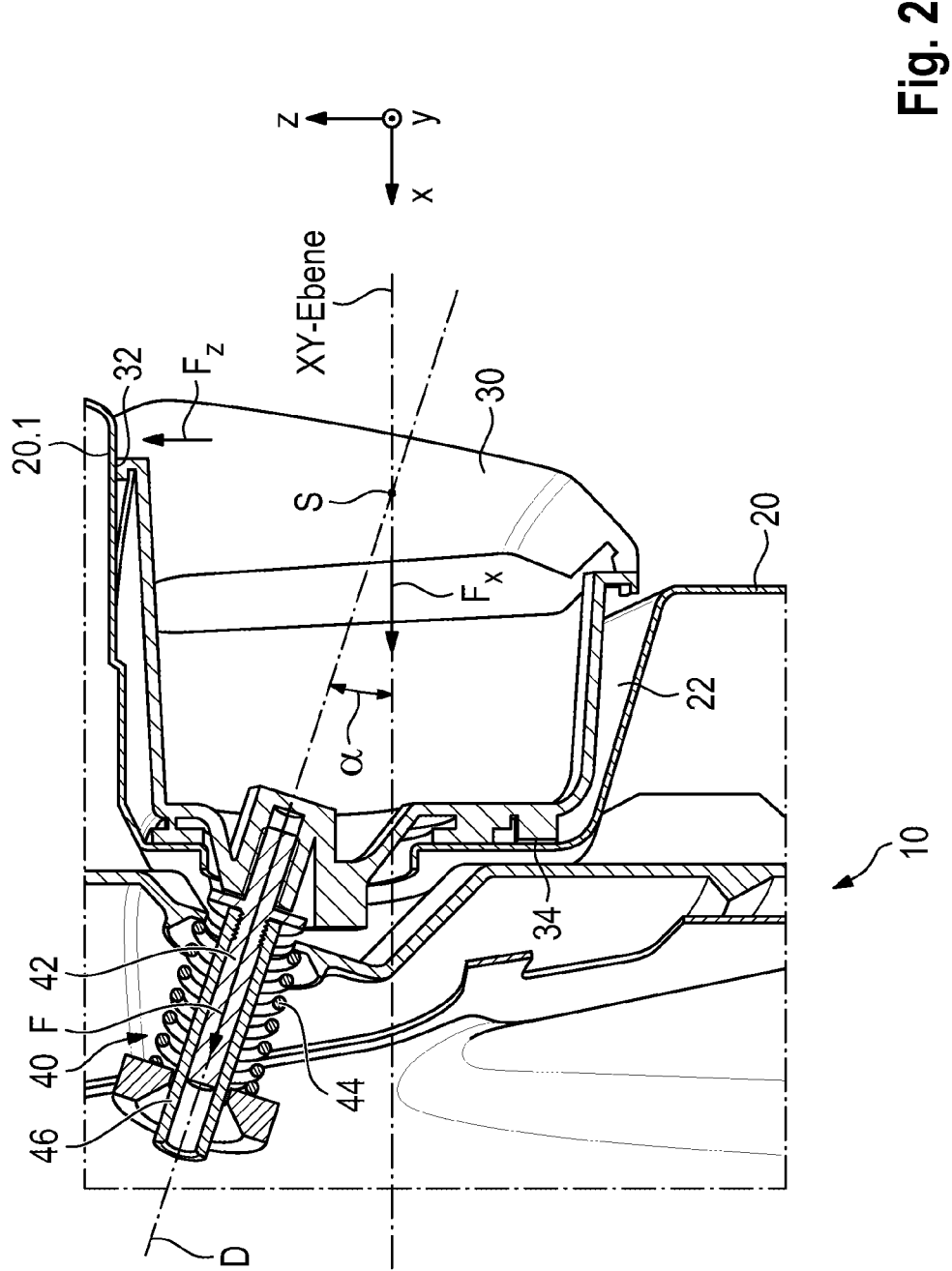
FIG. 2 shows the exemplary embodiment of FIG. 1, in which the vehicle part is received in the receptacle.

FIG. 2 shows the vehicle part 30 which is fastened in the receptacle 22 by way of the spring bolt 40 in the view from FIG. 1. As can be seen in FIGS. 1 and 2, the rotational axis D of the spring bolt 40 is arranged in such a way that it has precisely one point of intersection S with an XY-plane of the motor vehicle 10. As a result, the rotational axis D of the spring bolt 40 always has an angle of intersection α with an XY-plane of the motor vehicle 10. Therefore, according to the invention, the rotational axis D of the spring bolt 40 is not arranged parallel to an XY-plane of the motor vehicle 10 or in an XY-plane of the motor vehicle 10.

The axial force F of the spring bolt 40 along the rotational axis D can likewise be seen in FIG. 2. By virtue of the fact that the rotational axis D of the spring bolt 40 has precisely one point of intersection S with an XY-plane of the motor vehicle 10, at least one part Fz of the axial force F which results from the spring bolt 40 acts in the receptacle 22 in the Z-direction of the motor vehicle 10. As a result, the vehicle part can be pulled particularly satisfactorily against the top in the Z-direction of the receptacle 22, and the tolerance can be reduced to a very small value.

Here, the vehicle part 30 preferably has at least one Z-rest 32, by way of which the vehicle part 30 bears in the receptacle 22 in the Z-direction and via which the force Fz is transmitted to the vehicle body 20. The vehicle part 30 particularly preferably has two Z-rests 32.

FIG. 2 also shows by way of example a part Fx of the axial force F which results from the spring bolt 40 in the X-direction of the motor vehicle 10. The force Fx pulls the vehicle part 30 at the same time onto the bottom of the receptacle 22, as a result of which the tolerance in said direction can likewise be reduced to a very small value.

Here, the vehicle part 30 preferably has at least one X-rest 34, by way of which the vehicle part 30 bears in the receptacle 22 in the X-direction and via which the force Fx is transmitted to the vehicle body 20. The vehicle part 30 particularly preferably has three X-rests 32.

Therefore, in summary, the vehicle part 30 is mounted and held in a sprung manner in the receptacle 22 by way of the spring bolt 40. Here, tensile forces of the spring bolt 40 in the range of 400 N or more are preferably used. Here, tensile forces of 500 N±50 N are particularly preferred.

Figure 3:
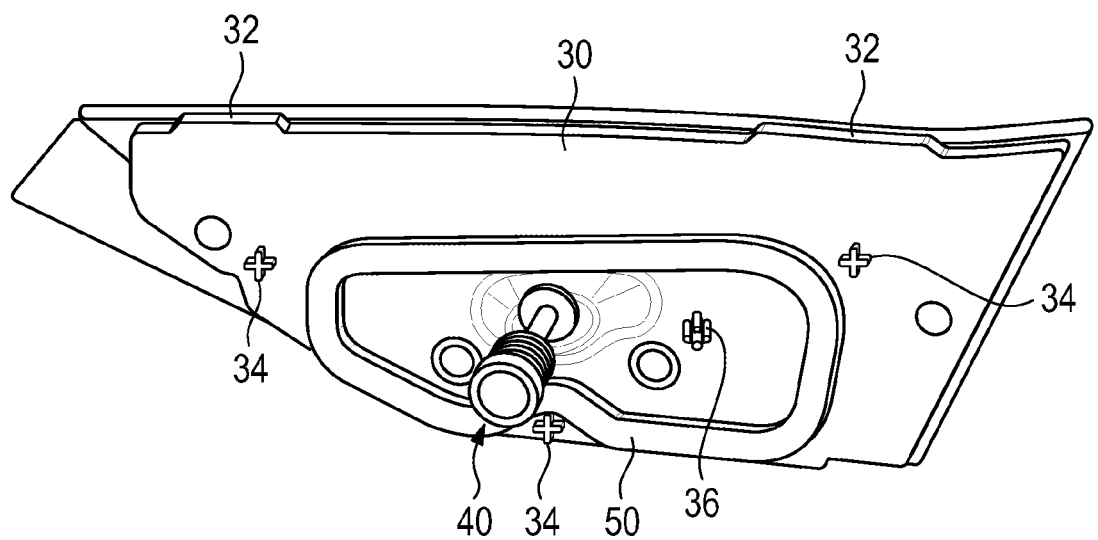
FIG. 3 shows a vehicle part in a rear view.

FIG. 3 shows the rear side of the vehicle part 30. The vehicle part 30 has by way of example three X-rests 34 which are preferably configured as cross ribs. Moreover, the vehicle part 30 has two Z-rests 32 which are configured as flat elements. Parts of the spring bolt 40 are likewise depicted in FIG. 3.

Therefore, a force equilibrium in two planes and over five points (three X-rests, two Z-rests) is achieved by way of the arrangement according to the invention of the spring bolt 40 in this embodiment. Here, said five points are sufficient to achieve particularly satisfactory orientation and fastening only with the aid of the spring bolt 40 which is oriented according to the invention.

Furthermore, FIG. 3 depicts a seal 50 which, in the installed state, is arranged between the receptacle 22 and the vehicle part 30. The seal 50 is preferably formed from a foamable material. The seal 50 is compressed during the tightening of the spring bolt 40. Moreover, the vehicle part 30 is oriented particularly satisfactorily in the seal 50 during the tightening of the spring bolt 40.

The spring bolt 40 is particularly preferably arranged at the centroid position of the seal 50 and/or the rests 32 and 34. As a result, particularly satisfactory orientation and fastening of the vehicle part 30 in the receptacle 22 are achieved.

Moreover, FIG. 3 depicts a Y-setting pin 36 which is arranged on the vehicle part 30. The Y-setting pin 36 serves for the additional orientation of the vehicle part 30 in the Y-direction of the motor vehicle 10.

Figure 4:
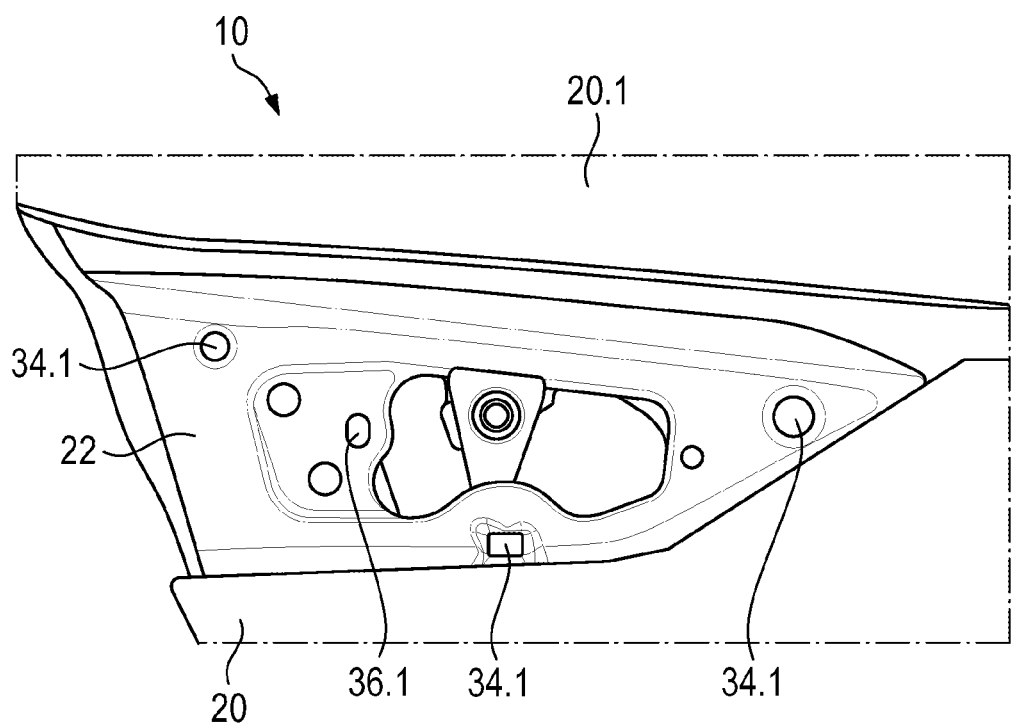
FIG. 4 shows a vehicle body with a receptacle for receiving a vehicle part in an outside view of the vehicle body.

FIG. 4 shows the vehicle body 20 with the receptacle 22 for receiving the vehicle part 30 in an outside view of the vehicle body 20. Here, the vehicle body 20 is configured by way of example as a tailgate 20.1.

In FIG. 4, three X-rest receptacles 34.1 and one Y-setting pin receptacle 36.1 are arranged in the bottom of the receptacle 22. In general, the receptacles receive the corresponding rests or pins, and facilitate the orientation of the vehicle part 30.

LIST OF DESIGNATIONS

10 Motor vehicle
20 Vehicle body
20.1 Tailgate
22 Receptacle
30 Vehicle part
32 Z-rest
34 X-rest
34.1 X-rest receptacle
36 Y-setting pin
36.1 Y-setting pin receptacle
40 Spring bolt
42 Threaded bolt
44 Spring
46 Housing with thread
50 Seal
D Rotational axis
S Point of intersection
α Angle of intersection
F Axial force
Fz Z-component of the axial force
Fx X-component of the axial force

What is claimed is:
1. A motor vehicle, comprising:
a vehicle body;
a vehicle part; and
a spring bolt for fastening the vehicle part in a receptacle of the vehicle body, wherein
a rotational axis of the spring bolt is arranged such that there is precisely one point of intersection with an XY-plane of the motor vehicle,
the vehicle part has at least one Z-rest which is configured as a flat element, wherein the flat element bears in a Z-direction of the motor vehicle against the vehicle body such that a force in the Z-direction of the motor vehicle is transmitted to the vehicle body by the flat element.

2. The motor vehicle according to claim 1, wherein the angle of intersection between the rotational axis of the spring bolt and the XY-plane of the motor vehicle lies in a range from 10° to 40°.

3. The motor vehicle according to claim 1, wherein the vehicle part is a vehicle light.

4. The motor vehicle according to claim 3, wherein the vehicle body comprises a tailgate which has the receptacle.

5. The motor vehicle according to claim 1, wherein the vehicle part has at least one X-rest which is configured as a cross rib, wherein the cross rib bears in an X-direction of the motor vehicle against the vehicle body such that a force in the X-direction of the motor vehicle is transmitted to the vehicle body by the cross rib.

6. The motor vehicle) according to claim 5, wherein the vehicle part has three X-rests and two Z-rests.

7. The motor vehicle according to claim 5, wherein the vehicle part has a Y-setting pin for orienting the vehicle part in the Y-direction of the motor vehicle.

8. The motor vehicle according to claim 1, wherein the rotational axis of the spring bolt is arranged parallel to an XZ-plane of the motor vehicle.

9. The motor vehicle according to claim 1, wherein the rotational axis of the spring bolt is arranged such that there is precisely one point of intersection with an XZ-plane of the motor vehicle.

10. The motor vehicle according to claim 9, wherein an angle of intersection between the rotational axis of the spring bolt and the XZ-plane of the motor vehicle lies in the range from 10° to 40°.

11. A vehicle part, comprising:
a spring bolt for fastening the vehicle part in a receptacle of a vehicle body of a motor vehicle, wherein
a rotational axis of the spring bolt is arranged such that, in the case of an intended arrangement of the vehicle part on the vehicle body, there is precisely one point of intersection with an XY-plane of the motor vehicle,
the vehicle part has at least one Z-rest which is configured as a flat element wherein, in the case of the intended arrangement of the vehicle part on the vehicle body, the flat element bears in a Z-direction of the motor vehicle against the vehicle body such that a force in the Z-direction of the motor vehicle is transmitted to the vehicle body by the flat element.

* * * * *